United States Patent
Amano et al.

(10) Patent No.: US 9,611,795 B2
(45) Date of Patent: Apr. 4, 2017

(54) CONTROL SYSTEM OF VEHICLE

(71) Applicants: Masaya Amano, Toyota (JP); Kenji Uchida, Nagoya (JP); Nobuyuki Tanaka, Toyota (JP); Yuki Hayakawa, Okazaki (JP); Go Hayasaka, Toyota (JP)

(72) Inventors: Masaya Amano, Toyota (JP); Kenji Uchida, Nagoya (JP); Nobuyuki Tanaka, Toyota (JP); Yuki Hayakawa, Okazaki (JP); Go Hayasaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/646,505

(22) PCT Filed: Dec. 4, 2012

(86) PCT No.: PCT/JP2012/081312
§ 371 (c)(1),
(2) Date: May 21, 2015

(87) PCT Pub. No.: WO2014/087474
PCT Pub. Date: Jun. 12, 2014

(65) Prior Publication Data
US 2015/0292427 A1 Oct. 15, 2015

(51) Int. Cl.
*G06F 19/00* (2011.01)
*F02D 41/06* (2006.01)
(Continued)

(52) U.S. Cl.
CPC ........... *F02D 41/062* (2013.01); *B60K 6/445* (2013.01); *B60W 10/06* (2013.01); *B60W 20/00* (2013.01);
(Continued)

(58) Field of Classification Search
CPC ...... F02D 41/062; F02D 11/105; F02D 41/22; B60W 20/00; B60W 10/06; B60K 2741/065; F02P 17/08
(Continued)

(56) References Cited

U.S. PATENT DOCUMENTS 8,814,749 B2 * 8/2014 Tanaka ............... B60W 20/00
477/110
2010/0305838 A1 * 12/2010 Yamamura .......... F02D 41/1497
701/113
(Continued)

FOREIGN PATENT DOCUMENTS

JP 2003-003884 A 1/2003
JP 2003-175747 A 6/2003
(Continued)

Primary Examiner — Shardul Patel
(74) Attorney, Agent, or Firm — Dinsmore & Shohl LLP

(57) ABSTRACT

A PM-ECU configured to control a drive torque of a vehicle is configured to be stopped in response to a driver's operation of a start switch and then activated in response to a driver's re-operation of the start switch. The PM-ECU is configured to be activated and place a restriction on the drive torque of the vehicle, in response to a re-operation of the start switch after the PM-ECU is stopped in response to an operation of the start switch. The PM-ECU is configured to remove the restriction on the drive torque in response to a reduction of an operation amount by which an accelerator pedal is operated.

6 Claims, 8 Drawing Sheets

(51) Int. Cl.
  *B60K 6/445*    (2007.10)
  *B60W 10/06*   (2006.01)
  *F02D 11/10*   (2006.01)
  *B60W 30/192*  (2012.01)
  *B60W 20/50*   (2016.01)
  *B60W 20/00*   (2016.01)

(52) U.S. Cl.
  CPC .......... *B60W 20/50* (2013.01); *B60W 30/192* (2013.01); *F02D 11/105* (2013.01); *F02D 2200/602* (2013.01); *F02D 2250/26* (2013.01); *Y02T 10/6239* (2013.01)

(58) Field of Classification Search
  USPC .................. 701/99, 110, 113; 477/3; 362/487
  See application file for complete search history.

(56) References Cited

U.S. PATENT DOCUMENTS

| | | | |
|---|---|---|---|
| 2012/0075875 A1* | 3/2012 | Son ........................... | B60Q 1/50 362/487 |
| 2013/0096808 A1* | 4/2013 | DeLaSalle ............ | B60W 10/06 701/110 |
| 2014/0087917 A1* | 3/2014 | Tanaka .................. | B60W 20/00 477/3 |

FOREIGN PATENT DOCUMENTS

| | | | | |
|---|---|---|---|---|
| JP | 2004-092623 A | | 3/2004 | |
| JP | 200492623 A | * | 3/2004 | ............ B60W 10/04 |
| JP | 2007-154674 A | | 6/2007 | |
| JP | 2014-069579 A | | 4/2014 | |

\* cited by examiner

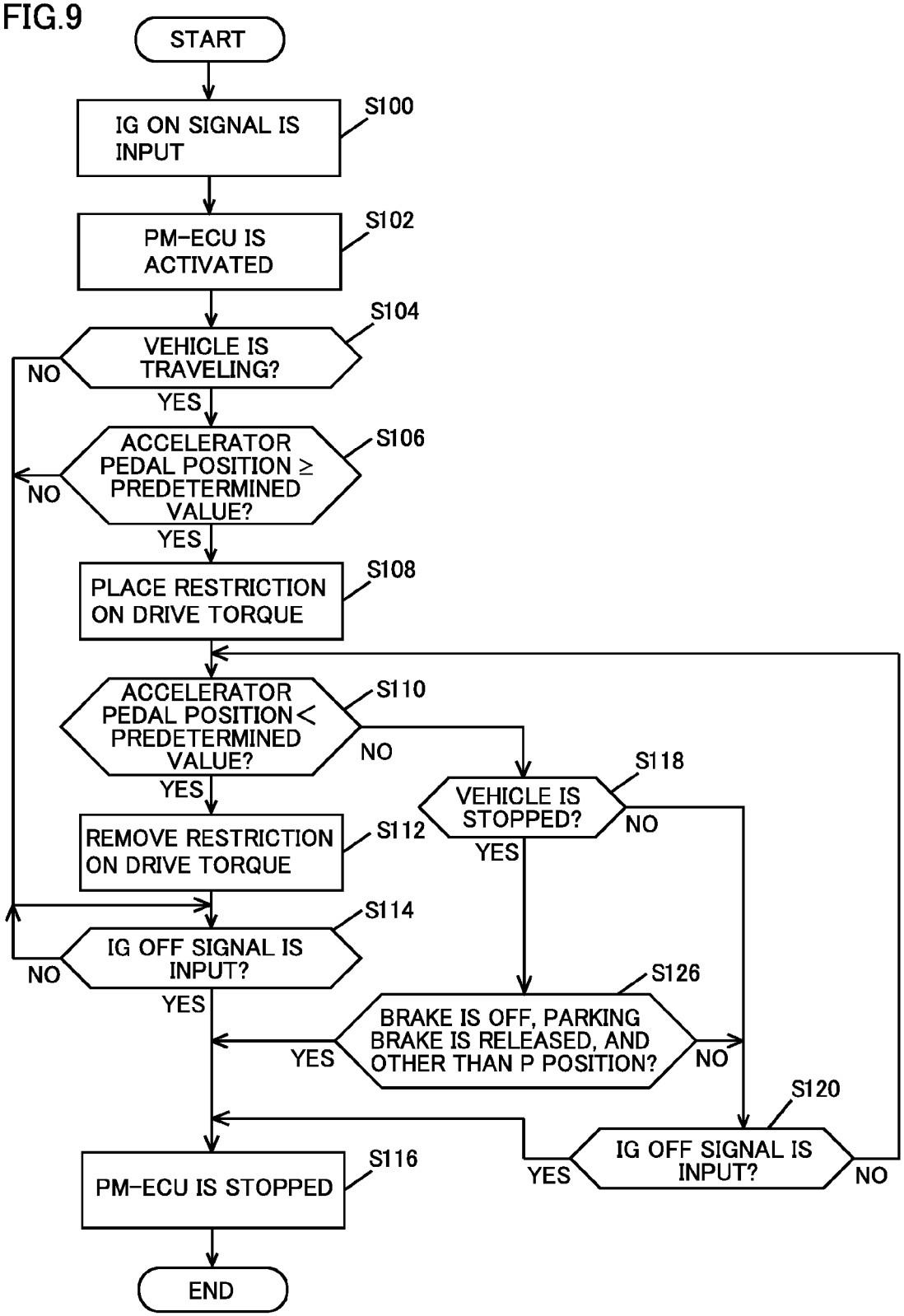

CONTROL SYSTEM OF VEHICLE

TECHNICAL FIELD

The present invention relates to a control system of a vehicle, and particularly to a technique for restricting a drive torque of a vehicle.

BACKGROUND ART

An ECU (Electronic Control Unit) is used as an electronic control device controlling a power train or the like mounted on a vehicle. For example, the ECU is activated in response to a turn-on operation of an ignition switch (or start switch) by a user (driver), and stopped in response to a turn-off operation thereof. If such an ignition switch is turned off and thereafter turned on while the vehicle is traveling, the power train having been stopped once is reactivated, which may cause regeneration of the drive torque which has been lost.

An example of the measures to prevent a shock due to the regenerated drive torque is disclosed in the abstract for example of Japanese Patent Laying-Open No. 2004-92623 (PTD 1). Specifically, it is disclosed, in the event of an engine stall while the vehicle is traveling, the engine is permitted to be started, on the condition that the throttle opening is a predetermined value or less, by turn-on of a starter relay.

CITATION LIST

Patent Document

PTD 1: Japanese Patent Laying-Open No. 2004-92623

SUMMARY OF INVENTION

Technical Problem

If, however, the engine is configured to be permitted to start on the condition that the throttle opening is a predetermined value or less, it is necessary for the driver to release the accelerator pedal and then operate the switch again, in the case for example where the engine does not start regardless of the fact that the driver has operated the switch. Due to this, the operations to be done while the vehicle is traveling can be complicated.

The present invention has been made to solve the above-described problem, and an object of the present invention is to prevent a drive torque from being unexpectedly generated and to regenerate a drive torque through less operations.

Solution to Problem

A control system of a vehicle which is caused to travel by an operation of an accelerator pedal by a driver includes: a control device configured to control a drive torque of the vehicle; and a switch operated by a driver for activating and stopping the control device. The control device is configured to be reactivated in response to a re-operation of the switch while the vehicle is traveling, after the control device is stopped in response to an operation of the switch, to place a restriction on the drive torque of the vehicle on a condition that the accelerator pedal is operated when the control device is reactivated, and to remove the restriction on the drive torque in response to a reduction of an operation amount by which the accelerator pedal is operated.

Although the drive torque is restricted as long as the driver keeps depressing the accelerator pedal, the driver can once release the accelerator pedal to achieve a desired drive torque without re-operating the switch. In this way, the drive torque is prevented from being unexpectedly generated and the drive torque can be regenerated through less operations.

The control device is configured to place a restriction on the drive torque of the vehicle on a condition that an accelerator pedal position or a throttle opening is a predetermined value or more when the switch is operated for reactivating the control device after the control device is stopped in response to an operation of the switch. The control device is configured to remove the restriction on the drive torque on a condition that the accelerator pedal position or the throttle opening becomes smaller than the predetermined value.

The state in which the accelerator pedal is operated can be determined by means of a numerical value representing the accelerator pedal position or the throttle opening. Thus, a processor such as ECU can be used to determine the state in which the accelerator pedal is operated.

The control device is configured to be stopped on a condition that the vehicle is stopped while the accelerator pedal position or the throttle opening is still the predetermined value or more.

The vehicle can be prevented from being unexpectedly started due to regeneration of the drive torque after the vehicle is stopped.

The control device is configured to be stopped on conditions that: the vehicle is stopped while the accelerator pedal position or the throttle opening is still the predetermined value or more; and a driver gets out of the vehicle.

The vehicle can be prevented from being unexpectedly started due to regeneration of the drive torque when the driver moves away from the vehicle after the vehicle is stopped.

The control device is configured to be kept activated on a condition that a parking brake is operated to generate a braking force or a shift position is a parking position when the vehicle is stopped while the accelerator pedal position or the throttle opening is still the predetermined value or more.

The control device can be kept activated in accordance with a driver's operation of the switch as long as there is no possibility that the vehicle is unexpectedly started.

Advantageous Effects of Invention

Although the drive torque is restricted as long as the driver keeps depressing the accelerator pedal, the driver can once release the accelerator pedal to achieve a desired drive torque without re-operating the switch. In this way, the drive torque is prevented from being unexpectedly generated and the drive torque can be regenerated through less operations.

BRIEF DESCRIPTION OF DRAWINGS

FIG. 9 is a (fourth) flowchart showing a process performed by the PM-ECU.

DESCRIPTION OF EMBODIMENTS

Figure 1:
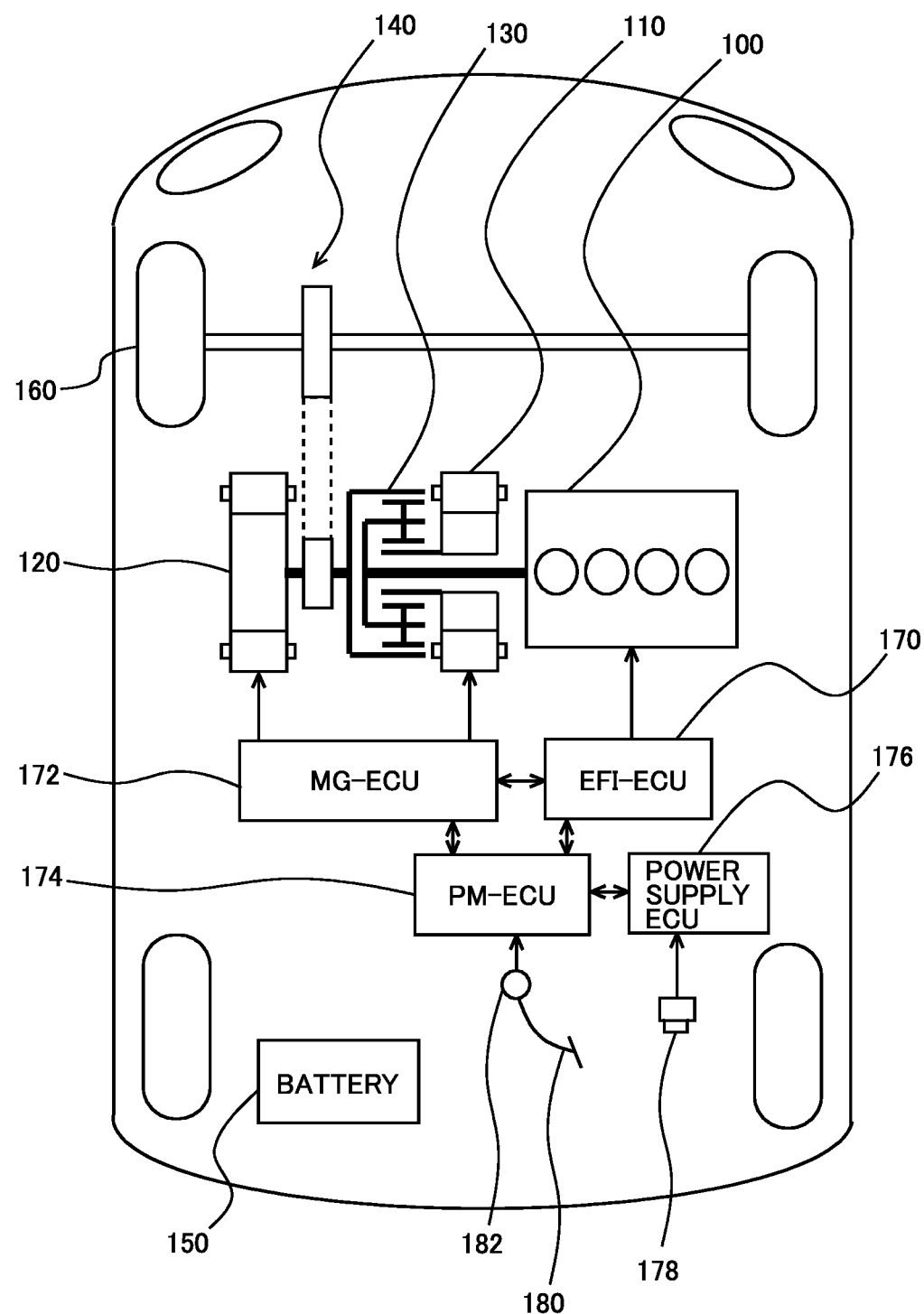
FIG. 1 is a schematic configuration diagram showing a hybrid vehicle.

In the following, an embodiment of the present invention will be descried with reference to the drawings. In the following description, the same parts are denoted by the same reference characters. They are named and function identically as well. A detailed description of them will therefore not be repeated.

Referring to FIG. 1, a hybrid vehicle includes an engine 100, a first motor generator 110, a second motor generator 120, a power split device 130, a reduction gear 140, and a battery 150. A power train of this vehicle includes engine 100, first motor generator 110, and second motor generator 120.

The hybrid vehicle is caused to travel by a drive force from at least one of engine 100 and second motor generator 120. Instead of the hybrid vehicle, an electric vehicle or fuel cell vehicle which is caused to travel by only a drive force from its motor may be used. Alternatively, a vehicle having only an engine as a drive source may also be used.

Engine 100, first motor generator 110, and second motor generator 120 are connected to each other through power split device 130. A motive power generated by engine 100 is split by power split device 130 into two paths. One is a path for driving front wheels 160 through reduction gear 140. The other is a path for driving first motor generator 110 and thereby generating electric power.

First motor generator 110 is a three-phase AC rotating electric machine including a U phase coil, a V phase coil, and a W phase coil. First motor generator 110 generates electric power from the motive power of engine 100 split by power split device 130. The electric power generated by first motor generator 110 is used differently depending on the state in which the vehicle is traveling or the SOC (State of Charge) of battery 150. For example, in the case of normal travel of the vehicle, the electric power generated by first motor generator 110 is directly used as electric power for driving second motor generator 120. In contrast, in the case where the SOC of battery 150 is lower than a predetermined value, the electric power generated by first motor generator 110 is stored in battery 150.

Second motor generator 120 is a three-phase AC rotating electric machine including a U phase coil, a V phase coil, and a W phase coil. Second motor generator 120 is driven by electric power which is at least one of the electric power stored in battery 150 and the electric power generated by first motor generator 110.

A drive force of second motor generator 120 is transmitted through reduction gear 140 to front wheels 160. Thus, second motor generator 120 assists engine 100 or causes the vehicle to travel with the drive force from second motor generator 120. Instead or in addition to front wheels 160, rear wheels may be driven.

When the hybrid vehicle is regeneratively braked, second motor generator 120 is driven by front wheels 160 through reduction gear 140, and second motor generator 120 operates as an electric generator. Thus, second motor generator 120 operates as a regenerative brake converting a braking energy into electric power. The electric power generated by second motor generator 120 is stored in battery 150.

Power split device 130 is made up of a planetary gear unit including a sun gear, a pinion gear, a carrier, and a ring gear. The pinion gear meshes with the sun gear and the ring gear. The carrier supports the pinion gear so that the pinion gear can rotate about its axis. The sun gear is coupled to the rotational shaft of first motor generator 110. The carrier is coupled to the crankshaft of engine 100. The ring gear is coupled to the rotational shaft of second motor generator 120 and to reduction gear 140.

Figure 2:
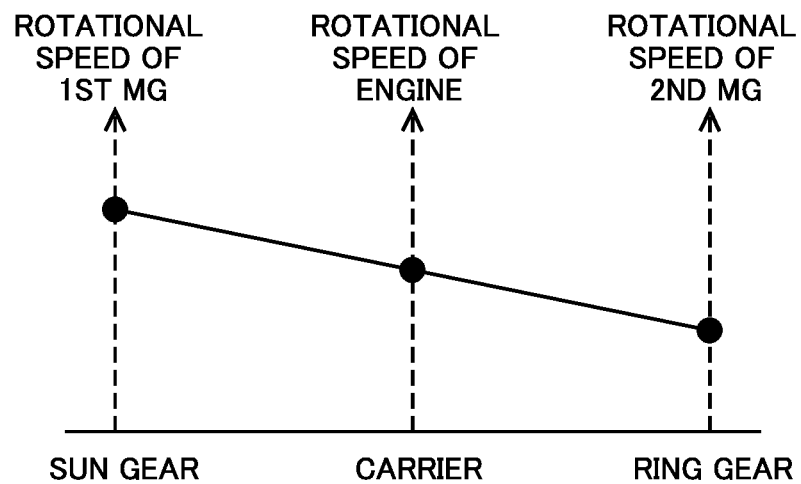
FIG. 2 is a diagram showing a nomographic chart of a power split device.

Engine 100, first motor generator 110, and second motor generator 120 are coupled through power split device 130 made up of the planetary gear unit, and accordingly, respective rotational speeds of first motor generator 110 and second motor generator 120 have a relation as shown in FIG. 2 in which they are connected by a straight line in a nomographic chart.

Referring back to FIG. 1, battery 150 is a battery pack constituted of a plurality of cells. Battery 150 is constituted for example of a plurality of battery modules connected in series, where the battery modules are each made up of a plurality of cells integrated into the battery module. Battery 150 is a lithium ion battery for example. Fully-charged battery 150 has a voltage for example of approximately 200 V.

In the present embodiment, engine 100 is controlled by an EFI (Electronic Fuel Injection)-ECU 170. First motor generator 110 and second motor generator 120 are controlled by an MG (Motor Generator)-ECU 172. EFI-ECU 170 and MG-ECU 172 are connected in such a way that enables them to bidirectionally communicate with a PM (Power train Manager)-ECU 174.

PM-ECU 174 has a function of managing EFI-ECU 170 and MG-ECU 172. For example, a command signal from PM-ECU 174 controls activation (power-on) and stop (power-off) of EFI-ECU 170 and MG-ECU 172.

PM-ECU 174 also issues a command to EFI-ECU 170 regarding a target power and a target torque for example of engine 100, and issues a command to MG-ECU 172 regarding electric power to be generated by first motor generator 110 and drive electric power to be generated by second motor generator 120. PM-ECU 174 thus corresponds to a control device for centralized control of the power train of the vehicle. By way of example, PM-ECU 174 determines the drive torque of the vehicle in accordance with an operation amount by which an accelerator pedal 180 is operated by a user (also referred to as an accelerator pedal position), and issues a command to EFI-ECU 170 and MG-ECU 172 so that the determined drive torque will be implemented. The accelerator pedal position is detected by an accelerator pedal position sensor 182. Activation and stop of PM-ECU 174 are managed by a power supply ECU 176.

Power supply ECU 176 determines whether or not a user (driver) has operated a start switch 178, generates an IG ON signal or an IG OFF signal in response to the user's operation of start switch 178, and outputs the generated signal to PM-ECU 174. By way of example, power supply ECU 176 determines, from the voltage which is changed by the user's operation of start switch 178, whether or not the user has operated start switch 178. As a method for determining whether or not a user has operated start switch 178, a common method for determining whether or not a switch has been operated may be used, and therefore, a detailed description thereof will not be repeated herein.

The present embodiment is configured, by way of example, in such a manner that a user's operation of start switch 178 while PM-ECU 174 is stopped causes power supply ECU 176 to generate the IG ON signal. As the IG ON signal is input from power supply ECU 176 to PM-ECU 174, PM-ECU 174 is activated.

Figure 3:
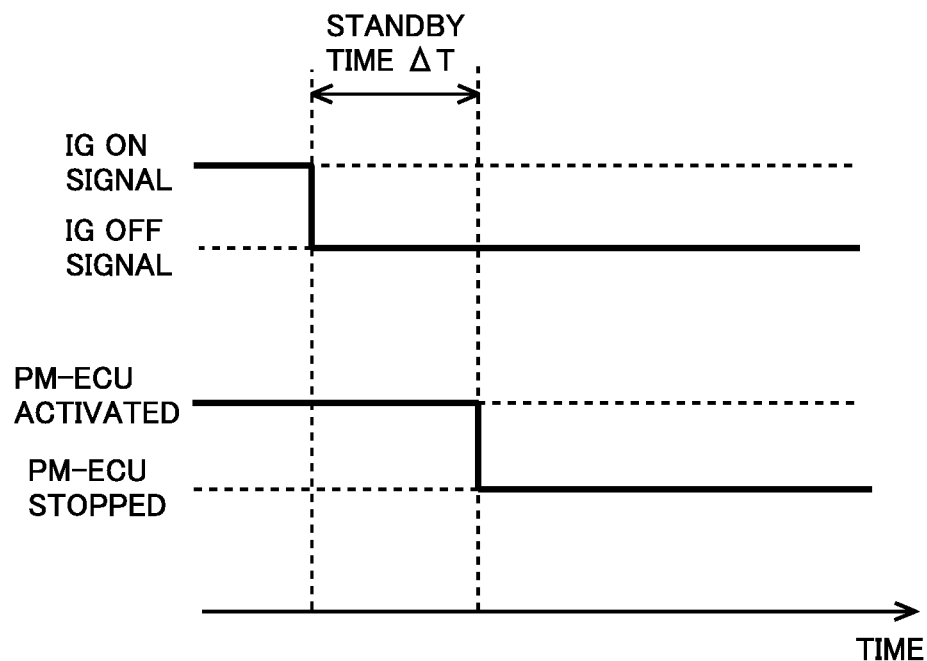
FIG. 3 is a diagram showing a standby time $\Delta T$ until a PM-ECU is stopped.

In contrast, a user's operation of start switch 178 while PM-ECU 174 is activated causes power supply ECU 176 to generate the IG OFF signal. As shown in FIG. 3, PM-ECU 174 is still kept activated for a predetermined standby time ΔT during which the IG OFF signal is continuously input from power supply ECU 176 to PM-ECU 174, and then stopped when the period during which the IG OFF signal has been continuously input from power supply ECU 176 becomes predetermined standby time ΔT or more.

Figure 4:
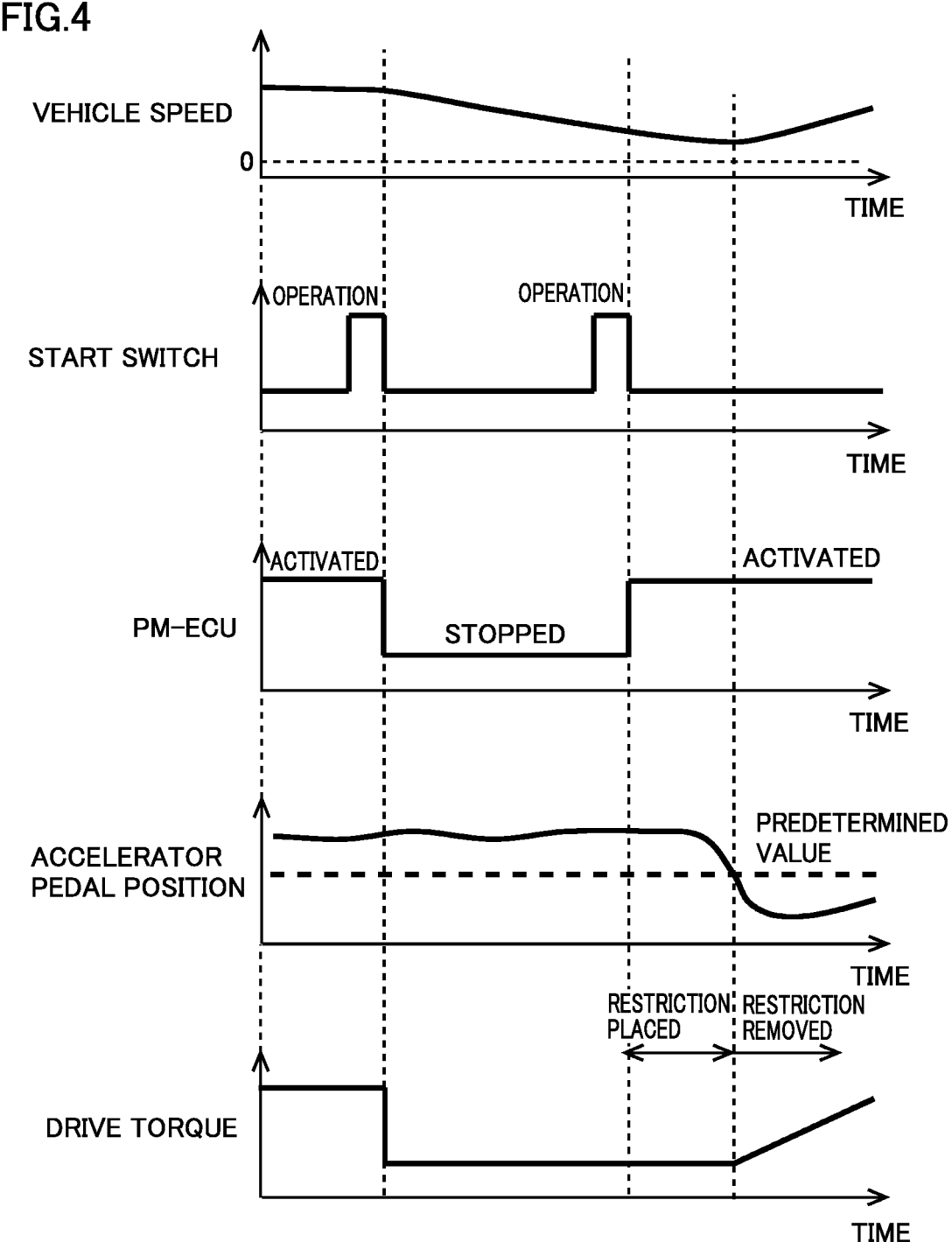
FIG. 4 is a timing chart showing a change of a state of the PM-ECU while the vehicle is traveling.

In the present embodiment, PM-ECU 174 can be stopped and activated by a user's operation of start switch 178 even while the vehicle is traveling. In the present embodiment, as shown in FIG. 4, PM-ECU 174 is stopped in response to an operation of start switch 178. After this, in response to an operation of start switch 178 which is done for reactivation of PM-ECU 174, PM-ECU 174 is activated and places a restriction on the drive torque of the vehicle. For example, the drive torque is restricted to zero, restricted to an upper limit or less, or restricted to be smaller than a non-restricted drive torque which is determined depending on the accelerator pedal position. PM-ECU 174 also removes the restriction on the drive torque in response to a reduction of the operation amount by which accelerator pedal 180 is operated.

More specifically, on the condition that the accelerator pedal position is a predetermined value or more when start switch 178 is operated for reactivating PM-ECU 174 after PM-ECU 174 is stopped in response to an operation of start switch 178, PM-ECU 174 places a restriction on the drive torque of the vehicle. When the accelerator pedal position becomes smaller than the predetermined value, the restriction on the drive torque is removed.

Accordingly, although the drive torque is restricted as long as the driver keeps depressing accelerator pedal 180, the driver can once release accelerator pedal 180 to achieve a desired drive torque without re-operating start switch 178. In this way, the drive torque is prevented from being unexpectedly generated and the drive torque can be regenerated through less operations.

It should be noted that the throttle opening may be used instead of the accelerator pedal position. Particularly in the case of a vehicle on which only engine 100 is mounted as a drive source, the throttle opening may be used instead of the accelerator pedal position.

Figure 5:
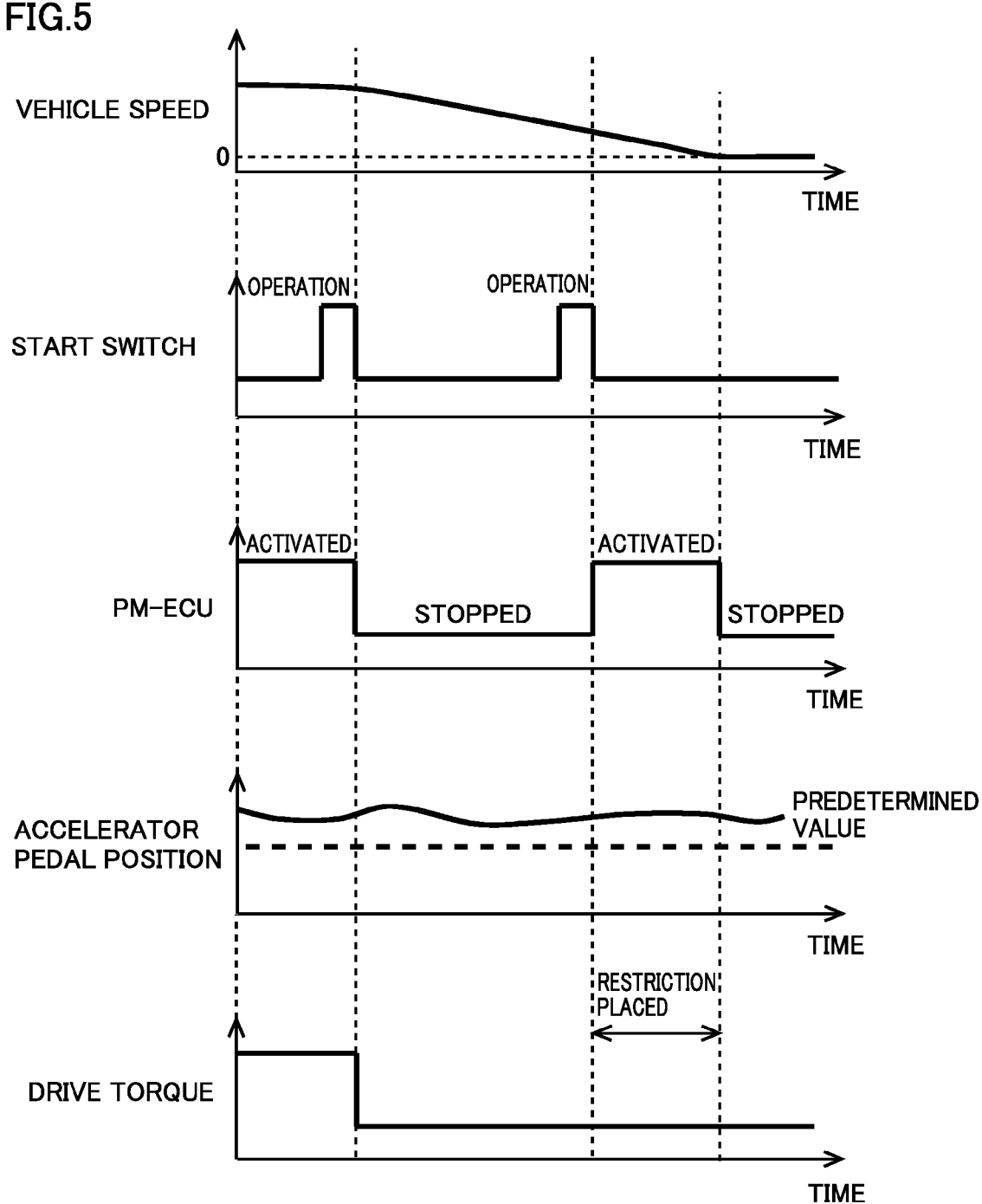
FIG. 5 is a timing chart showing a change of a state of the PM-ECU before and after the vehicle is stopped.

Although PM-ECU 174 is activated in response to an operation of start switch 178 as described above, PM-ECU 174 is stopped when the vehicle is stopped while the accelerator pedal position (or throttle opening) is still the predetermined value or more as shown in FIG. 5. In this way, the vehicle can be prevented from being unexpectedly started by a creep torque, which results from removal of the restriction on the drive torque in response to removal of the driver's foot from accelerator pedal 180 when the vehicle is stopped.

PM-ECU 174 may also be configured to be stopped on the conditions that: the vehicle is stopped while the accelerator pedal position (or throttle opening) is still the predetermined value or more; and the driver gets out of the vehicle. In this example, PM-ECU 174 may be configured to be kept activated on the condition that a parking brake (not shown) is operated to generate a braking force or the shift position selected by a shift lever (not shown) is the parking (P) position when the vehicle is stopped while the accelerator pedal position (or throttle opening) is still the predetermined value or more. The fact that the driver gets out of the vehicle may be detected from turn-off of a load sensor of the driver's seat or opening of the door of the driver's seat, for example.

PM-ECU 174 may alternatively be configured to be stopped on the conditions that: brake pedal 180 is not operated; the parking brake is released; and the shift position is any position other than the parking position, when the vehicle is stopped while the accelerator pedal position (or throttle opening) is still the predetermined value or more.

Figure 6:
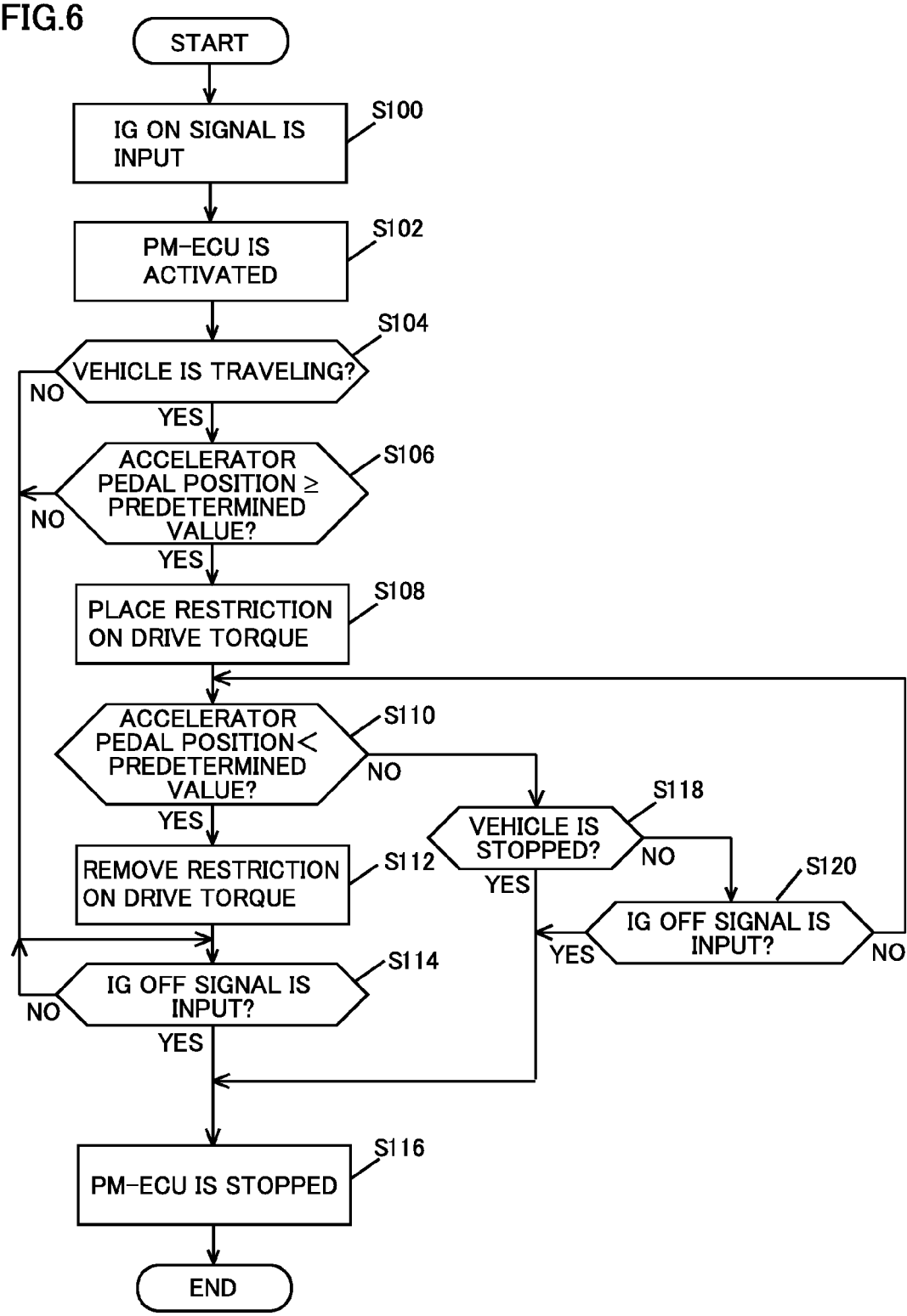
FIG. 6 is a (first) flowchart showing a process performed by the PM-ECU.

Referring to FIG. 6, a process performed by PM-ECU 174 will be described.

In step (step is hereinafter abbreviated as S) 100, the IG ON signal is input. Then, in step S102, PM-ECU 174 is activated. After this activation, it is determined in S104 whether or not the vehicle is traveling. Whether or not the vehicle is traveling is determined for example from whether or not the vehicle speed is higher than zero. The vehicle speed is detected for example from the rotational speed or the like of the wheels.

When the vehicle is traveling (YES in S104), it is determined in S106 whether or not the accelerator pedal position is a predetermined value or more. When the accelerator pedal position is the predetermined value or more (YES in S106), a restriction is placed on the drive torque in S108.

When the accelerator pedal position thereafter becomes smaller than the predetermined value (YES in S110), the restriction on the drive torque is removed in S112. When the IG OFF signal is input (YES in S114), PM-ECU 174 is stopped in S116.

Even when the accelerator pedal position is still the predetermined value or more (NO in S110), PM-ECU 174 is stopped in S116 when the vehicle is stopped (YES in S118). Otherwise, PM-ECU 174 is stopped in S116 when the IG OFF signal is input (YES in S120).

Figure 7:
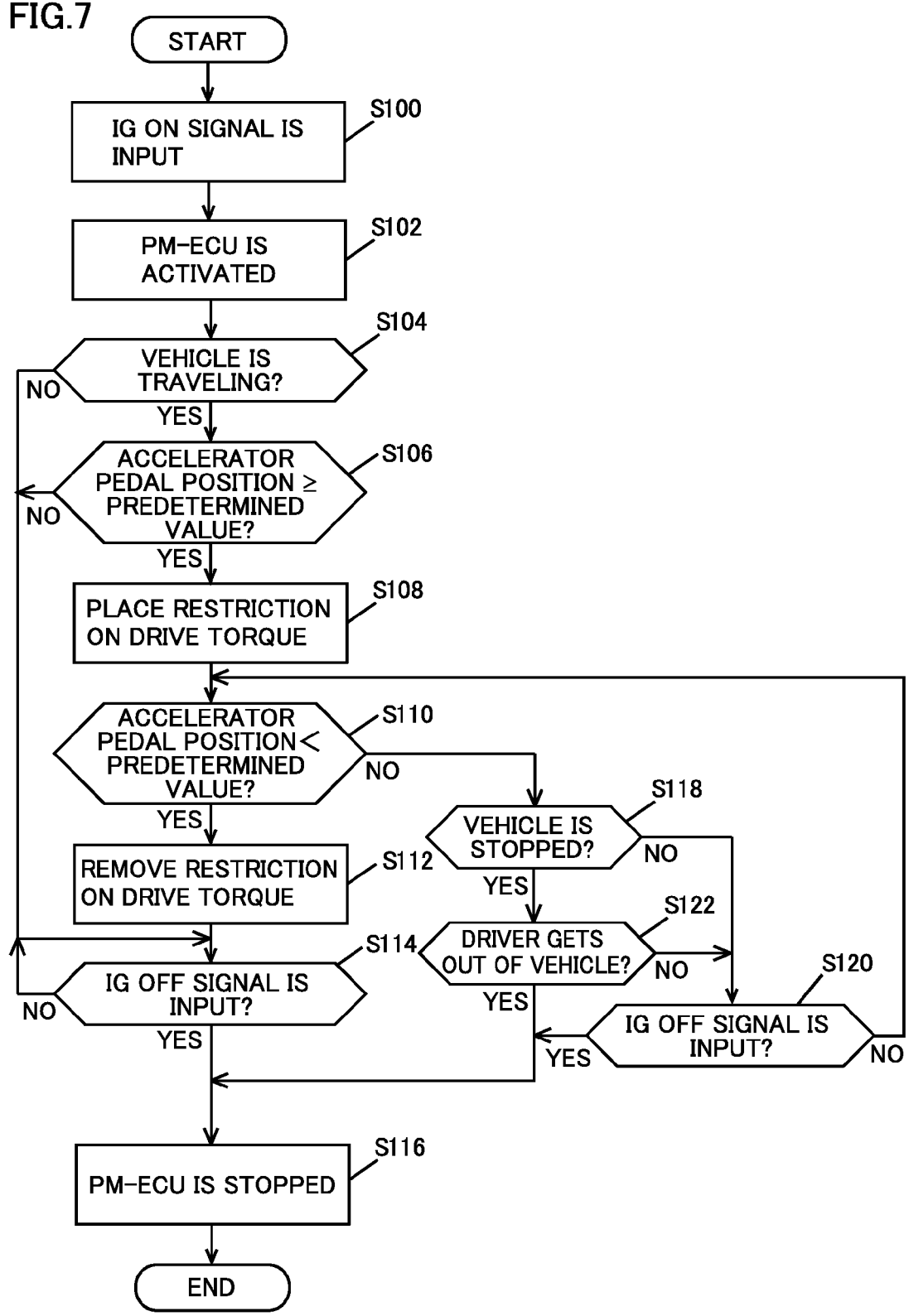
FIG. 7 is a (second) flowchart showing a process performed by the PM-ECU.

As shown in FIG. 7, PM-ECU 174 may also be configured to be stopped on the conditions that: the vehicle is stopped while the accelerator pedal position is still the predetermined value or more (YES in S118); and the driver gets out of the vehicle (YES in S122).

Figure 8:
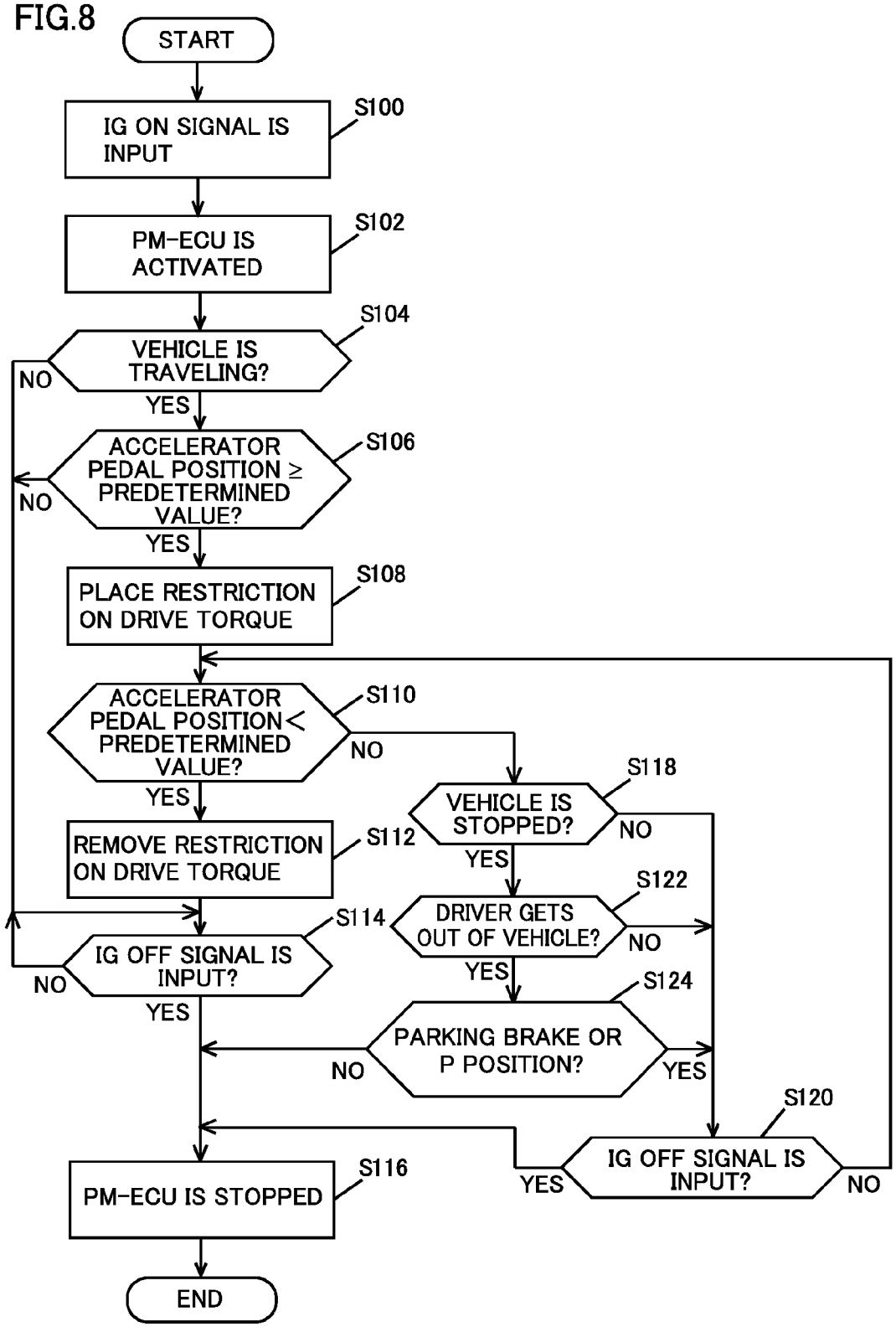
FIG. 8 is a (third) flowchart showing a process performed by the PM-ECU.

Further, as shown in FIG. 8, PM-ECU 174 may also be configured to be kept activated without being stopped on the condition that the parking brake is operated to generate a braking force or the shift position is the parking position (YES in S124) when the vehicle is stopped while the accelerator pedal position is still the predetermined value or more (YES in S118).

Furthermore, as shown in FIG. 9, PM-ECU 174 may also be configured to be stopped on the conditions that: the brake pedal (not shown) is not operated; the parking brake is released; and the shift position is any position other than the parking position (YES in S124), when the vehicle is stopped while the accelerator pedal position is still the predetermined value or more (YES in S118).

It should be construed that the embodiment disclosed herein is given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

100 engine; 110 first motor generator; 120 second motor generator; 130 power split device; 140 reduction gear; 150 battery; 160 front wheel; 170 EFI-ECU; 172 MG-ECU; 174

PM-ECU; 176 power supply ECU; 178 start switch; 180 accelerator pedal; 182 accelerator pedal position sensor

The invention claimed is:

1. A control system of a vehicle which is caused to travel by an operation of an accelerator pedal by a driver, comprising: a control device configured to control a drive torque of the vehicle; and a start switch operated by a driver for activating and stopping the control device, the control device being configured to be reactivated in response to a re-operation of the start switch while the vehicle is traveling, after the control device is stopped in response to an operation of the start switch, to place a restriction on the drive torque of the vehicle on a condition that the accelerator pedal is operated when the control device is reactivated, to determine whether an operation amount by which the accelerator pedal is operated is reduced by a certain amount, and to remove the restriction on the drive torque in response to the reduction of the operation amount by which the accelerator pedal is operated.

2. The control system of a vehicle according to claim 1, wherein the control device is configured to place a restriction on the drive torque of the vehicle on a condition that an accelerator pedal position or a throttle opening is a predetermined value or more when the start switch is operated for reactivating the control device after the control device is stopped in response to an operation of the start switch, and to remove the restriction on the drive torque on a condition that the accelerator pedal position or the throttle opening becomes smaller than the predetermined value.

3. The control system of a vehicle according to claim 2, wherein the control device is configured to be stopped on a condition that the vehicle is stopped while the accelerator pedal position or the throttle opening is still the predetermined value or more.

4. The control system of a vehicle according to claim 2, wherein the control device is configured to be stopped on conditions that: the vehicle is stopped while the accelerator pedal position or the throttle opening is still the predetermined value or more; and a driver gets out of the vehicle.

5. The control system of a vehicle according to claim 4, wherein the control device is configured to be kept activated on a condition that a parking brake is operated to generate a braking force or a shift position is a parking position when the vehicle is stopped while the accelerator pedal position or the throttle opening is still the predetermined value or more.

6. A method for controlling a driving torque of a vehicle, comprising: stopping a control device of the vehicle in response to an operation of a switch of the vehicle, the control device being configured to control the drive torque of the vehicle; reactivating the control device in response to a re-operation of the switch while the vehicle is traveling; placing a restriction on the drive torque of the vehicle on a condition that the accelerator pedal is operated when the control device is reactivated; determining whether an operation amount by which the accelerator pedal is operated is reduced by a certain amount; and removing the restriction on the drive torque when the operation amount by which the accelerator pedal is operated is reduced by the certain amount.

* * * * *